(No Model.)
J. W. JACOBS.
HARNESS FOR SINGLE HORSES.
No. 369,058. Patented Aug. 30, 1887.
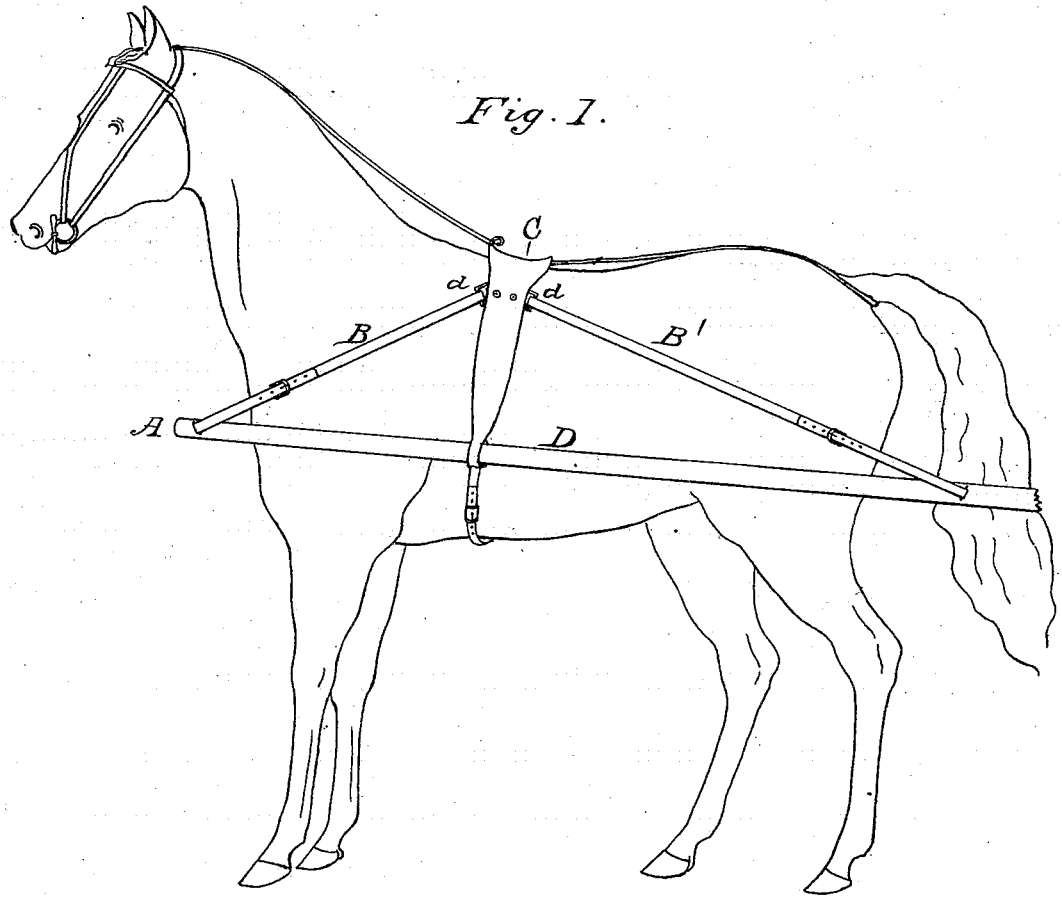
Fig. 1.
Fig. 2.
Fig. 3.
WITNESSES:
Ralph W Buckland Jr
Fred M Faller
John W. Jacobs
INVENTOR
BY Henry Still
ATTORNEY

UNITED STATES PATENT OFFICE.

JOHN W. JACOBS, OF DETROIT, MICHIGAN, ASSIGNOR OF ONE-HALF TO HENRY STILL, OF FREMONT, OHIO.

HARNESS FOR SINGLE HORSES.

SPECIFICATION forming part of Letters Patent No. 369,058, dated August 30, 1887.

Application filed September 17, 1886. Serial No. 213,810. (No model.)

*To all whom it may concern:*

Be it known that I, JOHN W. JACOBS, a citizen of the United States, residing at Detroit, in the county of Wayne, State of Michigan, have invented a new and useful Improvement in Harness for Single Horses, of which the following is a specification.

My invention pertains to the method of attaching an animal to the thills of a gig, buggy, or other vehicle, my object being to provide a safe, simple, and effective plan whereby the weight to be carried by the animal will be reduced to a minimum point and its motions be unimpeded by a lot of cumbersome superfluous straps and trappings.

By my method I am enabled to dispense with the use of a "collar" and "breast-strap," (commonly called "breast-collar,") as well as the "breeching," together with the straps necessarily employed in supporting the breeching in its proper place against the rump of the animal, as well as the "holdback-straps" attached to the breeching and thills to prevent the animal from coming in contact with the vehicle in descending grades.

Of course I do not intend the device for use where heavy loads are being moved, but for the more light work ordinarily performed by single horses. I attain these desirable ends by the simple mechanism illustrated in the accompanying drawings, in which—

Figure 1 shows the device in position; Fig. 2, a form of loop used upon the front end of thills; Fig. 3, a form of loops attached to the "back-pad."

Similar letters refer to similar parts of the figures.

My improvement consists simply of straps of leather or textile material of sizes proportioned to the amount of strain to be resisted, having one end of such strap attached to the front end of the thill, thence passing upward and back to the back-pad or tree-pad C, to which it is firmly attached at or near the terret, thence downward and back to the whiffletree, or a loop fixed upon the upper side of the thill near the cross-bar.

By attaching the strap to the back-pad near the median line of the animal's back I avoid the possibility of interfering with the proper position of the girths, whereby chafing is prevented. The thills are supported by the ordinary method of passing through loops fastened to the back-pad and confined there by girths.

A, Fig. 1, shows the position of loop upon the front end of thill D, through which passes strap B, having a buckle so fixed that the strap may be lengthened or shortened as desired, with the other end of the strap buckled in the loop *d*. Strap B', likewise with buckle for adjustment to any required length, is also buckled in loop at back-band, with the other end fastened to the whiffletree, or, as I prefer, to a loop or staple fixed upon the upper outer side of the thill D near the cross-bar.

Having described my invention, what I desire to claim and secure Letters Patent for is—

The improvement in harness herein described, consisting of the combination, with the back-pad or saddle, of straps attached thereto leading forward for connection with the thills or shafts, and of corresponding straps leading backward for attachment to the thills or whiffletree, substantially as and for the purpose described.

JOHN W. JACOBS.

Witnesses:
    DANIEL J. CAMPAU, Jr.,
    HENRY STILL.